US008297463B2

(12) United States Patent
McQuaid et al.

(10) Patent No.: US 8,297,463 B2
(45) Date of Patent: Oct. 30, 2012

(54) CLOSURE FOR AN EQUIPMENT SUB

(75) Inventors: James G. McQuaid, Mineral Wells, TX (US); Donald W. Ray, Millsap, TX (US); Firdosh Mehta P E, Weatherford, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 1175 days.

(21) Appl. No.: 12/105,323

(22) Filed: Apr. 18, 2008

(65) Prior Publication Data
US 2009/0260290 A1  Oct. 22, 2009

(51) Int. Cl.
*B65D 45/28* (2006.01)
*B65D 43/26* (2006.01)
*B65D 51/04* (2006.01)
*B65D 43/16* (2006.01)
*E06B 3/34* (2006.01)
*E05F 1/00* (2006.01)
*E05C 17/18* (2006.01)

(52) U.S. Cl. ........ 220/323; 220/263; 220/817; 220/848; 49/41; 49/371; 292/256.65; 292/256.63; 292/256.5

(58) Field of Classification Search .......... 220/581, 220/323, 326, 263, 817, 843–845, 848; 49/41, 49/371; 292/256.5, 256.6, 256.63, 256.65, 292/257; 105/377.05–377.06, 377.11
See application file for complete search history.

(56) References Cited

U.S. PATENT DOCUMENTS

| 6,206,227 | B1 | 3/2001 | Ferri, Jr. |
| 6,439,415 | B1 | 8/2002 | Salim et al. |
| 7,341,161 | B2 | 3/2008 | McGuire |
| 7,802,694 | B2 * | 9/2010 | Lee ............................ 220/582 |
| 2007/0051732 | A1 | 3/2007 | Squalli |

FOREIGN PATENT DOCUMENTS

| CN | 1512090 A | 7/2004 |
| GB | 2172956 B | 10/1985 |
| WO | WO 02/097319 A1 | 12/2002 |

* cited by examiner

*Primary Examiner* — Robin Hylton
(74) *Attorney, Agent, or Firm* — Reinhart Boerner Van Deuren P.C.

(57) ABSTRACT

A closure is shown for an equipment sub. A closure door is carried by a sub body and movable thereto between open and closed positions for providing access to a pressure vessel. Various improvements are disclosed including a new mechanism for positioning wedge shaped arcuate segments between the door and the sub body, a retainer mechanism for guiding movement of cross bars, a split hinge adjustment mechanism for adjusting planarity and concentricity between the closure door and the sub body, an increased annular wall body thickness region surrounding the sealing surface for reducing warpage during welding, a pressure lock rod member which also engages a combination of cross bars and a crank for driving the cross bars, and a pry bar that can facilitate better manually operated leveraging of the closure door.

25 Claims, 8 Drawing Sheets

CLOSURE FOR AN EQUIPMENT SUB

FIELD OF THE INVENTION

The present invention generally relates to closure devices and more specifically relates to closures which can be quickly opened and closed to provide access to the interior contents of a pressure or a vacuum vessel, a pipeline or conduit, or other types of such equipment in which there is likely to be a pressure differential across a closed opening.

BACKGROUND OF THE INVENTION

A variety of pressure vessels (including vacuum vessels) are known in the prior art which require a closure device for access. For example, such equipment includes gas filters, filter separators, gas scrubbers, pipeline scraper, launchers and receivers, meter provers, access openings to pressure vessels, liquid phase separators/coalescers, and the like. The equipment of the above type often features an ASME and/or API quick opening closure for access to the vessel or equipment interior.

For example, the examples of quick opening type closures therefore include U.S. Pat. No. 6,439,415 assigned to the present assignee, Perry Equipment Corporation and UK Patent No. GB 2172956. These patents show a closure for an equipment sub which includes a cylindrical aperture which is closed by a circular closure door member having an O ring seal.

The present invention pertains to improvements over the state of the art, including several different inventive aspects.

BRIEF SUMMARY OF THE INVENTION

The present invention has several aspects, each of which is patentable in its own right.

One aspect of the present invention is directed toward a more simplified mechanism for positioning the arcuate wedge segments between a sub body and a closure door. A closure apparatus according to this aspect includes a sub body having an annular opening and a closure door carried by the sub body and movable thereto between open and closed positions. A plurality of arcuate segments are arranged between the closure door and the sub body in the closed position with bracketless gaps being defined between the arcuate segments. A drive hub is rotatably mounted to the closure door for rotation about a drive axis and a plurality of cross bars connect the drive hub and the arcuate segments. Each cross bar has a first end pivotably mounted to the drive hub and a second end pivotably mounted to one of the arcuate segments.

A second aspect of the present invention is directed to the use of retainers to retain cross bars along the closure door such that the cross bars and arcuate segments can float axially relative to the door. A closure apparatus in this regard comprises a sub body having an annular opening and including a wedge shaped recess. A closure door is carried by the sub body and is movable thereto between open and closed positions. A plurality of arcuate segments are provided in which each arcuate segment includes a wedge shaped projection that engages the wedge shaped recess in the closed position. A plurality of cross bars are provided, with each cross bar carrying one of the arcuate segments. The retainers are mounted to the closure door and retain the cross bars to the closure door such that the cross bars and arcuate segments float axially relative to the door. During movement from the open to the closed position the wedge shaped projection of each arcuate segment self adjusts and self locates as it co-acts with the wedge shape recess due to the cross bar floating axially.

In accordance with this second aspect, further subsidiary feature may be a device providing such a retainer. For example, the retainer may comprise of having a bolt having an end stop in which the bolt extends through a slot in one of the cross bars. As a result the retainers locate and guide the movement of the cross bars radially. A spring may be carried by the bolt for biasing its respective cross bar axially relative to the closure door and guiding the flotation of the cross bar and the arcuate wedge segment carried thereby.

A third aspect of the present invention is directed toward improvements in the adjustment mechanism for adjusting planarity of the closure door relative to a sub body. A closure apparatus according to this aspect includes a sub body having an annular opening with a sealing surface defined about a central axis and a closure door carried by the sub body and moveable thereto between an open and closed position. A first hinge is mounted to the closure door and a second hinge is mounted to the sub body with a swing arm connecting the two hinges. A first adjustment mechanism is provided on the first hinge. The first hinge is radially spaced from the central axis wherein the adjustment mechanism is adjustable to adjust the planarity between the closure door and a sub body (e.g. which may be in a plane defined by an annular contact ring provided by a sealing surface).

According to this third aspect, a further subsidiary aspect may be that a second adjustment mechanism is provided on the second hinge wherein the second adjustment mechanism is adjustable to adjust the concentricity between the closure door and the sub body. Most preferably, the concentricity adjustment and the planarity adjustment mechanism are provided on different hinges and not contained on the same hinge. As such, only one adjustment mechanism may be provided on the first hinge and only a second on the second hinge. With a preferred arrangement provided such that the adjustment of the first mechanism to adjust the planarity does not alter concentricity and wherein adjustment of the second adjustment mechanism to adjust concentricity does not affect planarity. This way, one can adjust one parameter without inadvertently affecting the other parameter.

A fourth aspect of the present invention may be directed toward maintaining a thicker annular wall body region in the sealing wall portion of a sub body that surrounds the sealing surface. According to this aspect a closure apparatus includes a sub body having an annular opening and including a wedge shaped recess and a conical sealing surface proximate the wedge shaped recess. The sub body is a metal forging and has an annular wall body region and a neck region in which the neck region provides a welding surface to facilitate welding to a pressure vessel (e.g. any of the examples mentioned in the background section above, including vacuum vessels which are a type of pressure vessel). A closure door is carried by the sub body and movable thereto between open and closed positions. A plurality of arcuate segments are provided in which each arcuate segment includes a wedge shaped projection engaging the wedge shaped recess in the closed position. The annular wall body region of the sub body has an annular portion surrounding the sealing surface that becomes thicker in cross section as the sealing surface and annular body extend toward the neck region. This thicker annular portion may provide means for reducing warpage during welding of the neck region. This runs contrary to prior designs which have employed a narrowing annular portion that would facilitate very slight deflection during sealing engagement.

Yet another aspect of the present invention is directed toward an improvement to the lock member. In such a closure apparatus, the lock member may be mounted in a pressure relief hole formed through the closure door and in which the lock member can engage the crank and one of the cross bars. For example, this may take the form of an extension plate mounted to one of the bars in which the extension plate has a hole defined therethrough for receiving the lock member not only through the crank but also through the through hole of the cross bar extension plate. This feature can serve to better prevent tampering during use.

Yet a further aspect is directed toward an improved manual leveraging feature for a closure apparatus set forth herein, wherein the closure door can more easily be maneuvered by a single worker. Specifically a pry bar is receivable into a first coupler on the hinge assembly for facilitating manually operated swinging movement of the closure door. This may take the form of a hole formed through a vertical tubular column of the hinge assembly and/or a bracket assembled to the outside of the hinge assembly.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
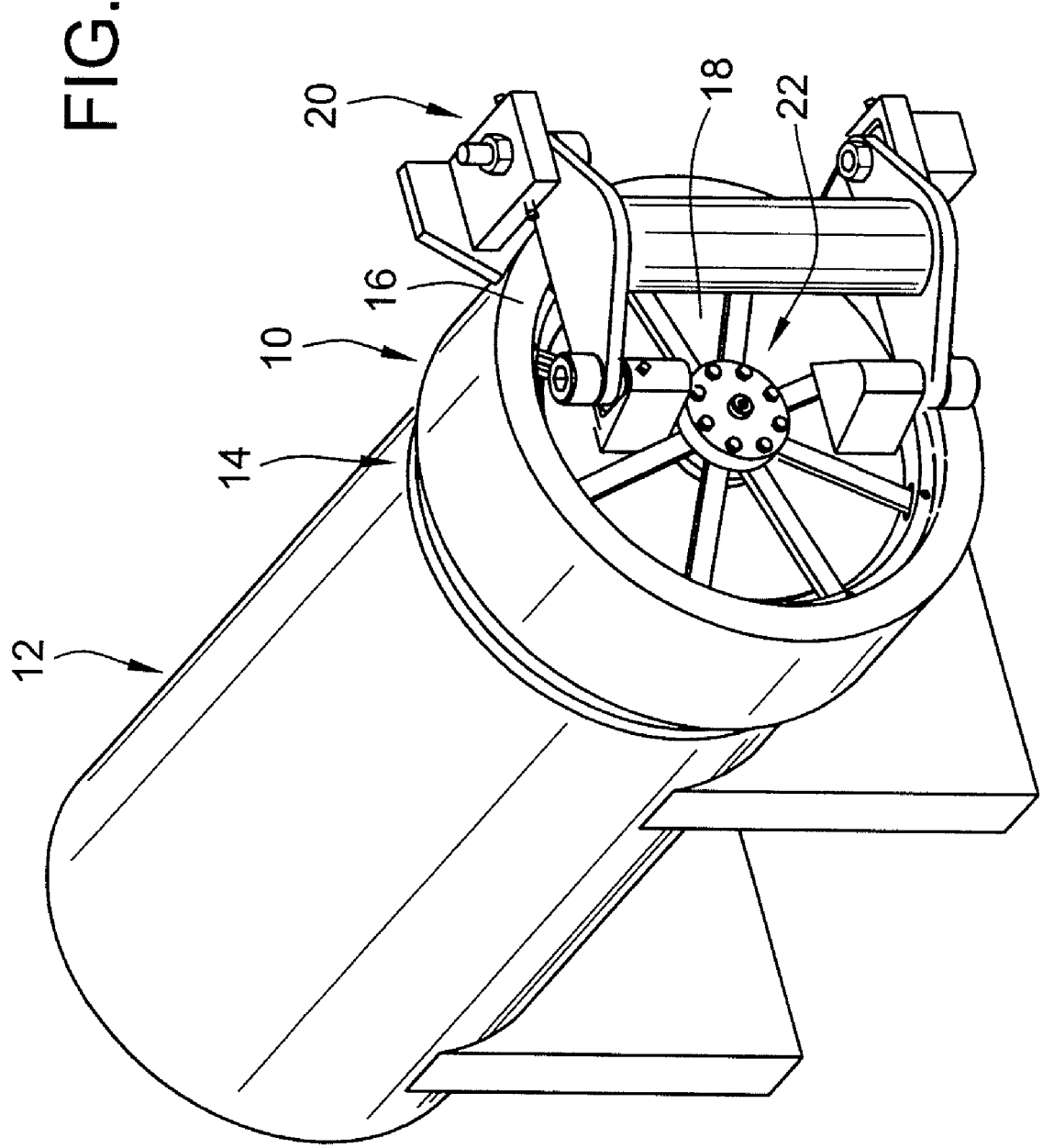
FIG. 1 is a perspective view of a pressure vessel having a closure apparatus welded thereto to provide for quick access in closing of the pressure vessel in accordance with an embodiment of the present invention.
Figure 1A:
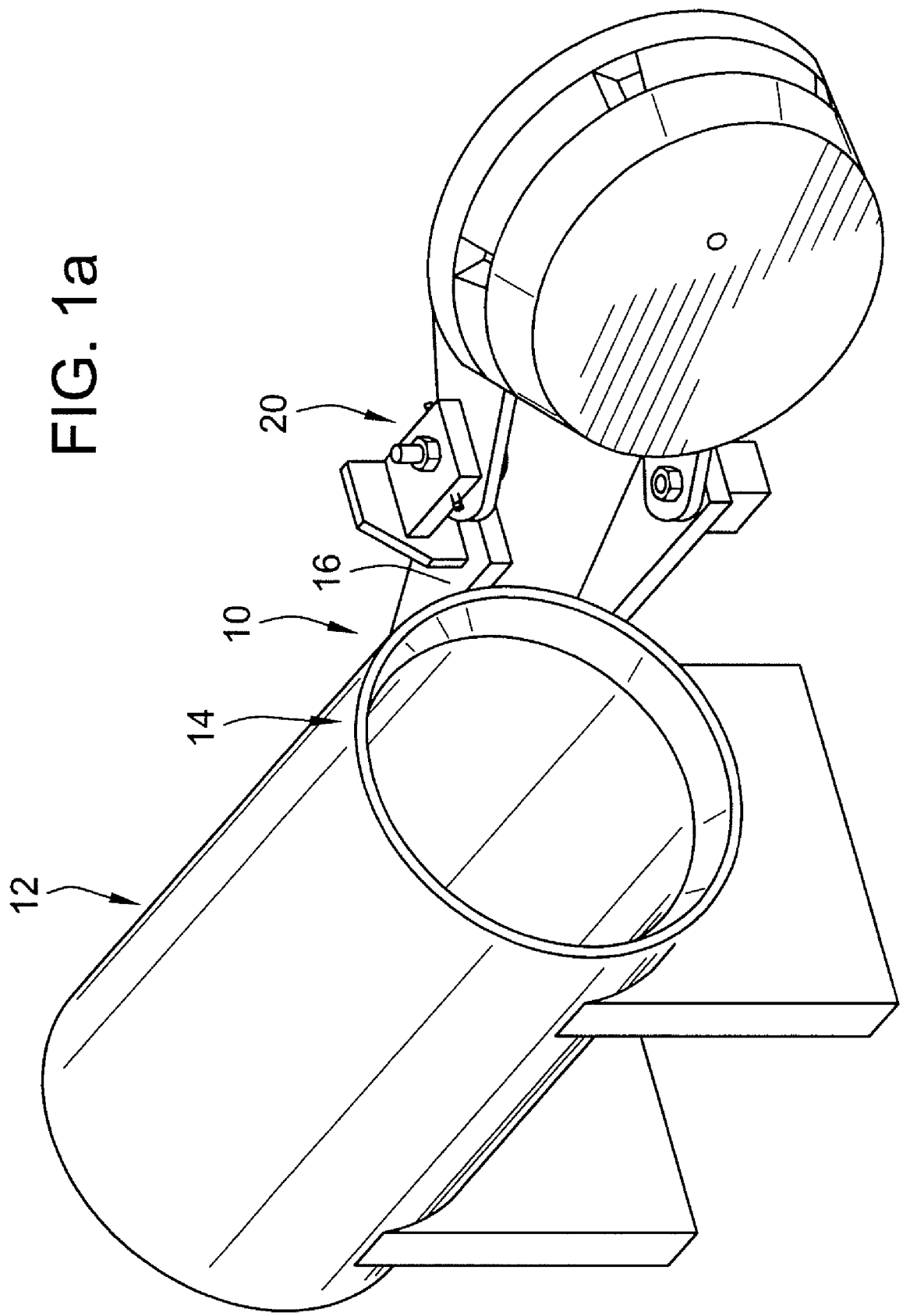
FIG. 1A is a prospective view similar to FIG. 1 but with the closure apparatus shown in an open position.
Figure 2:
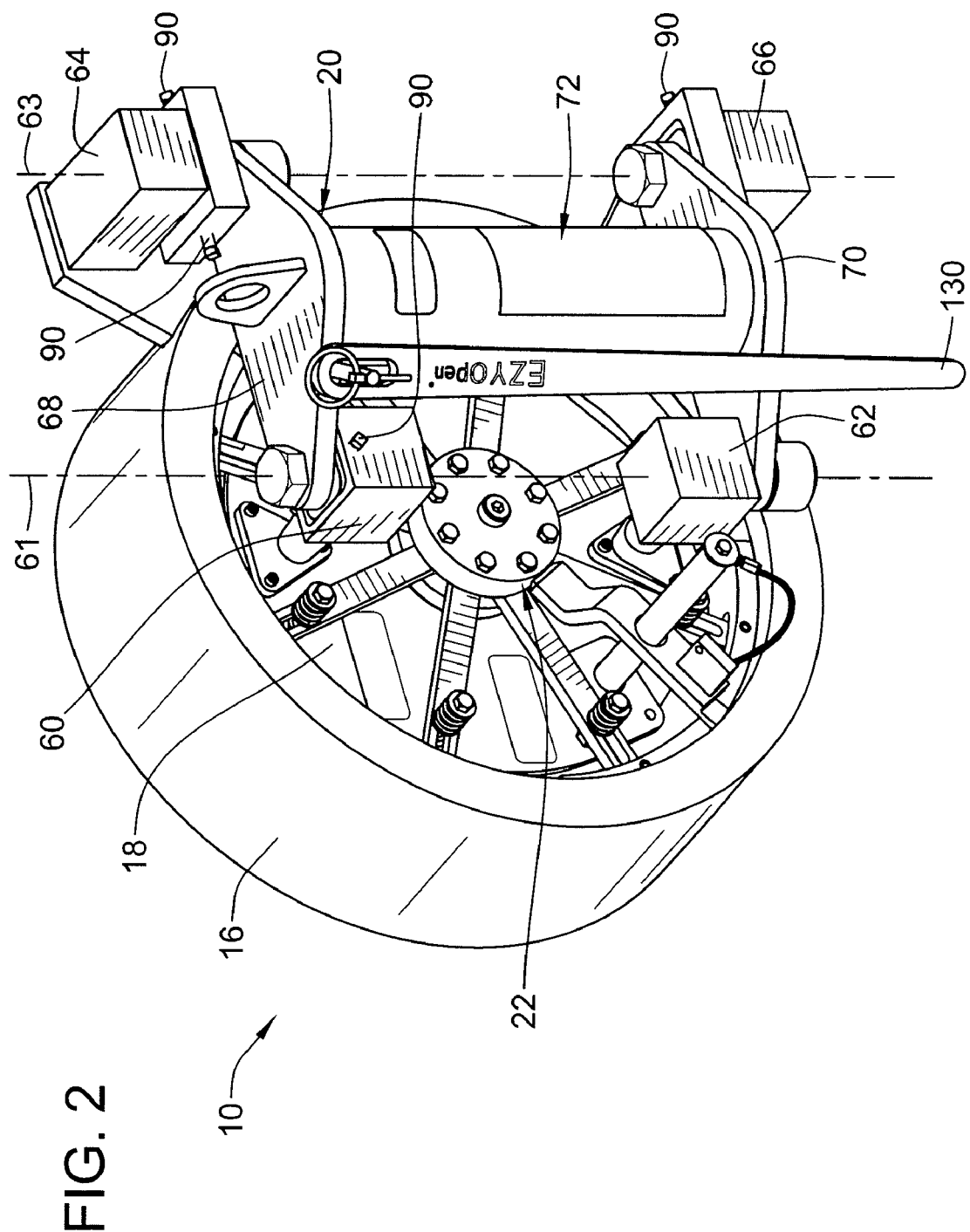
FIG. 2 is an isometric view of the closure apparatus shown in FIG. 1.
Figure 4:
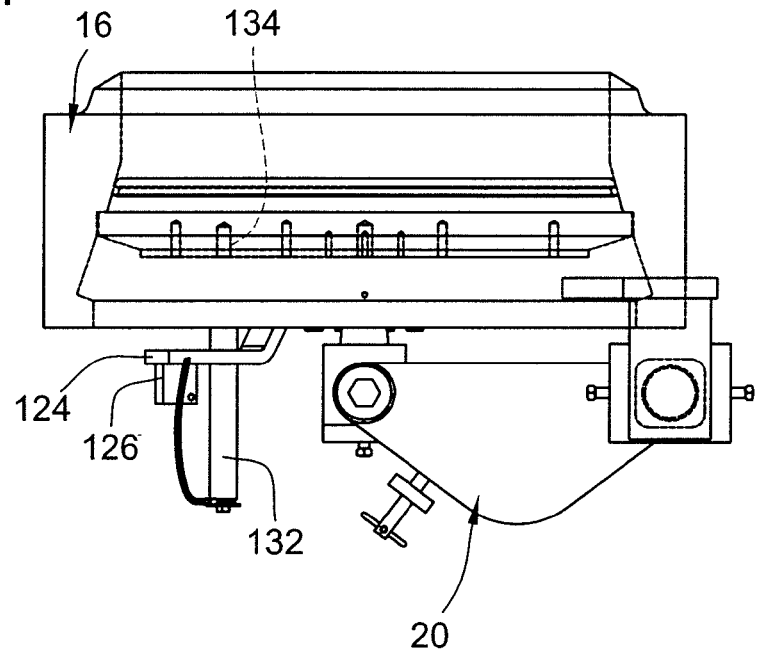
FIG. 4 is a top view of the closure apparatus shown in FIG. 2.

Turning to FIG. 1, an embodiment of the present invention has been illustrated as a closure apparatus 10 which is welded onto a suitable pressure vessel 12 (e.g. a tank, pipeline, or other enclosure which is subject to a pressure differential such as either higher pressure or lower pressure than the outside of the enclosure) via a weld seam 14. The closure apparatus 10 can be quickly opened and closed to provide for access to the interior of the pressure vessel 12 for such things as inspection, filter element replacement or other maintenance or service. As shown in FIG. 1, the enclosure apparatus is in a closed position sealing the contents within the pressure vessel. As shown in FIG. 1A, the closure apparatus also has an open position which allows for access to the contents within the pressure vessel.

Turning to FIGS. 2-7, the closure apparatus 10 generally includes a sub body 16 that provides an entrance opening. The sub body 16 can be mounted by welding directly to the cylinder sidewall or opening of a pressure vessel. The closure apparatus also includes a closure door 18 (also referred to as "a door closure") that is carried by the sub body and moveable thereto between the open and closed position shown in FIGS. 1 and 1A. The closure door 18 is adapted to close and seal off the entrance opening in the sub body. A hinge assembly 20 facilitates swinging movement of the closure door 18 between open and closed positions. The closure apparatus 10 also includes a door locking assembly 22 that can locked and unlocked to maintain a closed position and/or allow for opening of the closure door 18. Now that a general structural overview of the embodiment has been illustrated, further details will had to such components or sub-assemblies.

Turning first to the sub body 16, the sub body 16 is preferably formed from a metal (e.g. steel) forging with various portions or regions that are machined to provided for surfaces as may be desired. As illustrated, the sub body includes an annular wall body region 26 and a reduced diameter neck region 28. The neck region 28 includes a conical welding surface 30 that facilitates welding and secure attachment of the sub body 16 to a pressure vessel 12 via the weld seam 14. The sub body 16 generally defines an annular opening 32 that extends all the way through the wall body about a central axis 34. The annular opening 32 may include several different surface characteristics to include a wedge shaped recess 36 (which is adapted to receive wedge shaped arcuate segments of the door locking assembly 22), a door stop abutment shoulder 38, and a conical sealing surface 40.

Turning to the closure door 18, the closure door 18 generally includes an annular and planar wall body 42 that is arranged to be aligned coaxial along the central axis 34 when properly and accurately adjusted to be concentric and planar relative to the sub body 16 and in the closed position. As such, the closure door is also concentric about the central axis 34. The closure door 18 includes an inner surface 44 facing the inside of the sub body (upon which contained pressure acts) and an outer surface 46 facing axially outwardly away from the sub body. Along its outer peripheral surface, the closure door defines an abutment shoulder 48 that is adapted to abut against a corresponding door abutment shoulder 38 of the sub body 16 when in the closed position. Extending axially inward therefrom is complimentary conical surface that seats or almost seats upon the conical sealing surface 40 of the sub body 16. An annular groove 52 is also provided in the outer periphery which has seated therein an elastomeric O-ring seal 54 which is compressed between the closure door 18 and the sub body 16 to effectuate a hermetic seal between the closure door 18 and the sub body 16 when in the closed position under a locked condition.

In accordance with one of the aspects of the present invention, the illustrated embodiment includes a thicker wall bodied portion 27 in the region surrounding the conical sealing surface 40. Specifically this thicker wall portion 27 gets thicker in cross section as a sealing surface 40 and the annular wall body region 26 extend axially toward the neck region 28. This provides means for reducing warpage during welding of the neck region to a pressure vessel. In previous designs as exemplified by the patents mentioned in the background, this region gets thinner in cross section, which may provide for deflection in certain sealing characteristics. However, in the present embodiment the wall body portion can be thicker for the purpose of reducing warpage during welding. Further, this also can reduce or eliminate standard machining that is done to the outside of this sealing wall body region of metal forgings. For example, the sealing wall body region surrounding the sealing surface can provide for an outer peripheral surface that is a raw forged cylindrical surface as opposed to having a conical flanged surface machined therein to taper this region.

The hinge assembly 20 mounts the closure door 18 to the sub body 16 and facilitates swinging pivoting movement of the closure door relative to the sub body 16. The hinge assembly 20 generally includes inner upper and lower hinges 60, 62 that are commonly aligned along a vertical axis 61 that generally intersects the central axis 34 in the closed position when properly aligned. The hinge assembly 20 also includes outer upper and lower hinges 64, 66 which are commonly aligned about a second vertical axis 63 in spaced parallel relation to the first vertical axis 61. As shown, the inner hinges 60, 62 are disposed over the closure door 18 and mounted thereto while the outer hinges 64, 66 are spaced outside the perimeter of the closure door 18 and are mounted directly to the outer periphery of the sub body 16. Upper and lower swing arm plates 68, 70 connect the upper hinges 60, 64 and the lower hinges 62, 66 respectively. A vertical tubular column 72 integrally connects the upper and lower swing arm plates 68, 70 and the hinges 60, 62, 64, 66 together.

Figure 5:
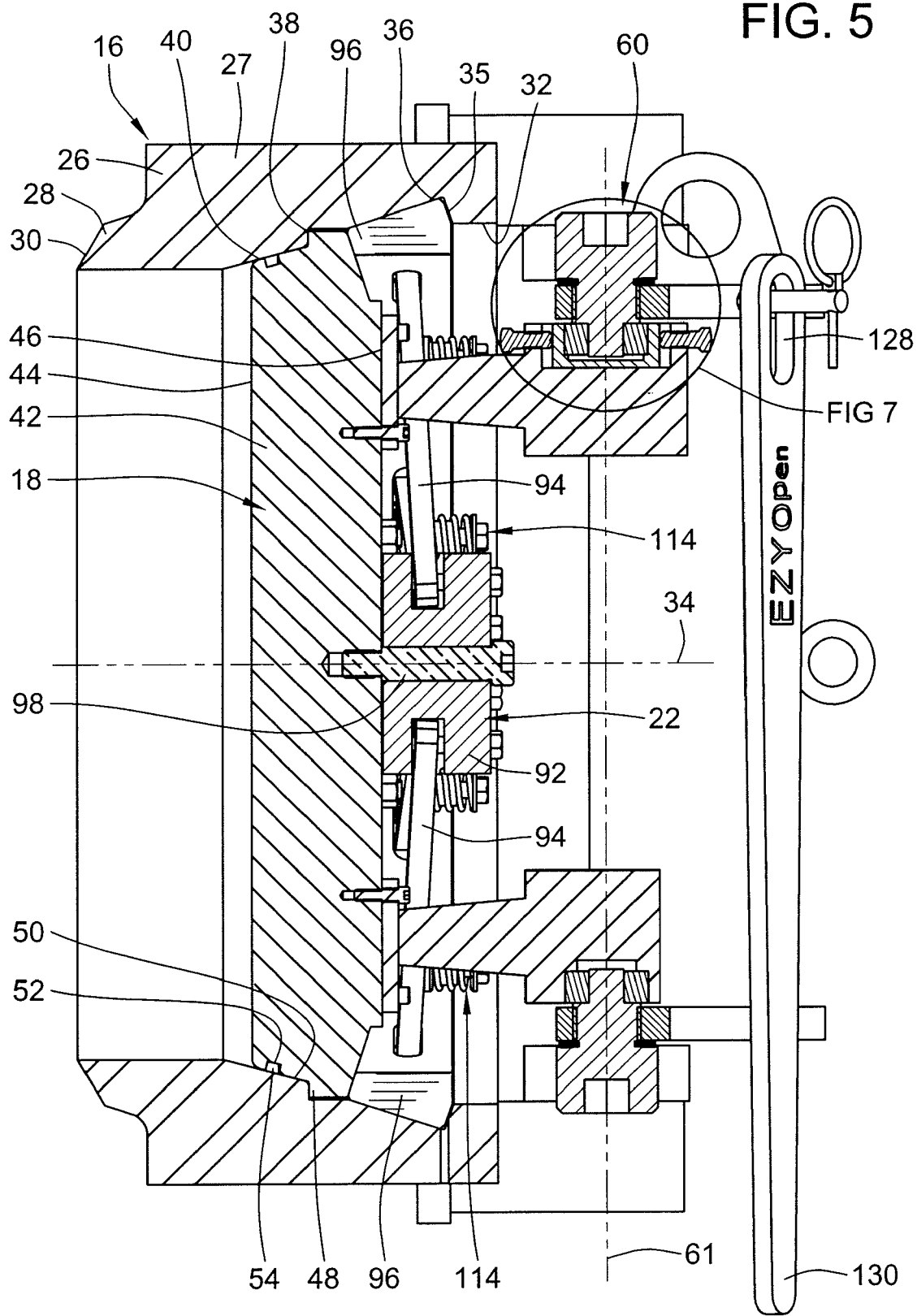
FIG. 5 is a cross-section of the closure apparatus taken about line A-A in FIG. 3.

Three of the hinges 60, 64 and 66 feature adjustment mechanisms that can be manually adjusted to adjust the overall concentricity and planarity of the closure door 18 relative to the sub body 16. By planarity, what is meant is that the plane of closure door is adjusted to be maintained generally perpendicular to the central axis 34. By concentricity, what is meant is that the central axis of the sub body 16 and closure door are adjusted to be maintained concentric and/or coaxial about a center axis (e.g. represented by the common central axis 34 as illustrated in aligned position). For purposes of detail, one of the adjustable hinges and in this case the inner upper hinge 60 is illustrated in greater detail in FIG. 7. However, it will be understood that the two other adjustable hinges (namely outer upper hinge 64 and outer lower hinge 66) can share similar components and cross sectional configuration although maybe in a different orientation. Additionally, the inner lower hinge 62 would also be of a similar configuration but without an adjustment mechanism necessary (e.g. no set screws need to be provided and without a slidable bearing house as shown in FIG. 5).

Figure 7:
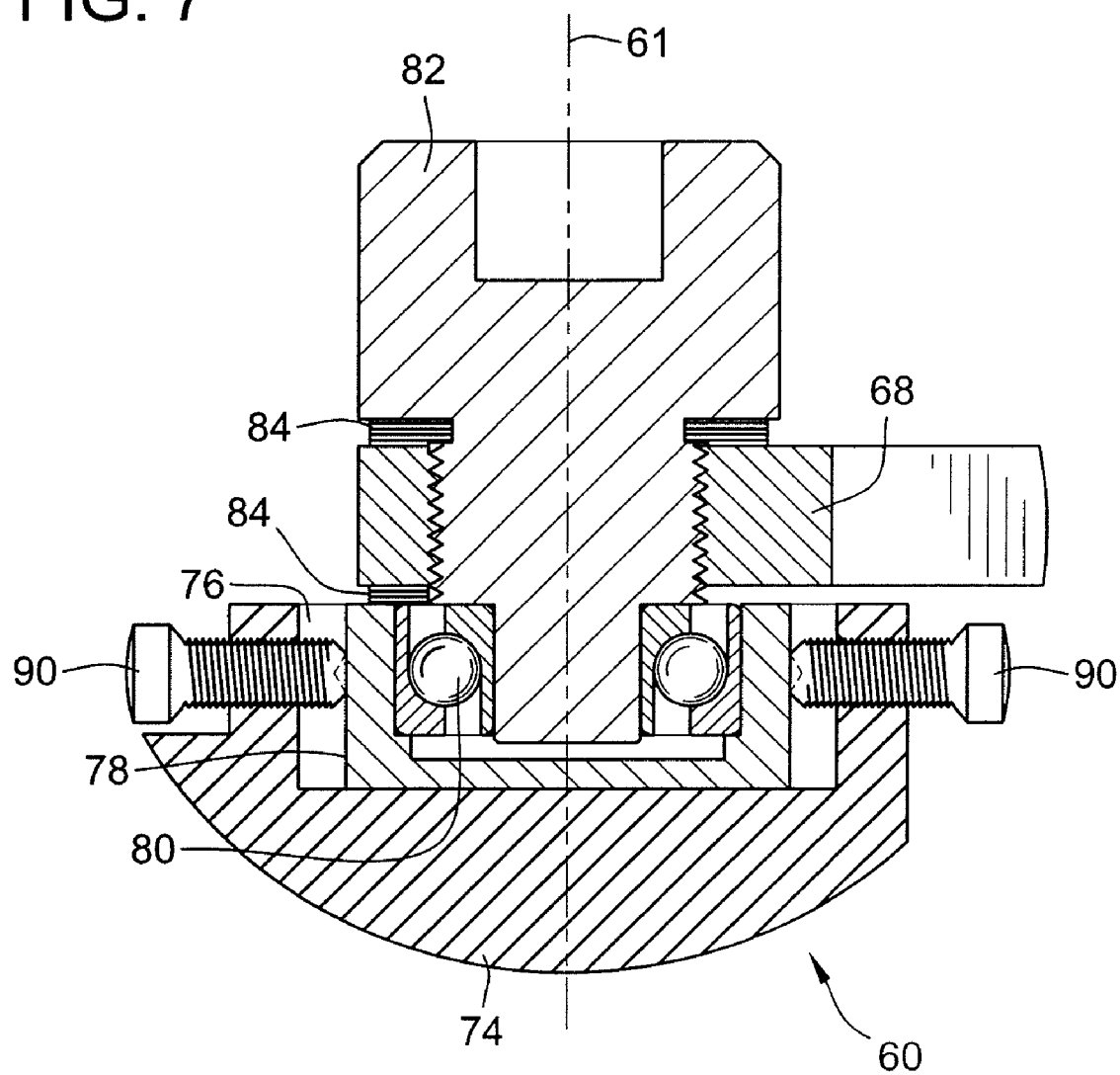
FIG. 7 is a cross-section of a first upper central hinge (attached to the door) which is an enlarged view of a portion of FIG. 5 (e.g. the upper hinge shown in FIG. 5)

Turning in greater detail to hinge details shown in FIG. 7 (and again the other adjustable hinges have the same components but with different orientations and attachments), the inner upper hinge 60 includes a hinge housing 74 that can be fastened and securely mounted directly to the front outer surface 46 of the closure door 18. The hinge housing defines a cavity 76 in which rests and slides a bearing housing 78 which can be slid in horizontally within the cavity 76. The bearing housing 78 contains a bearing head into which is received a head hinge bolt 82 that also passes through and is received into the upper swing arm plate 68 as illustrated. Shims 84 may also be employed as appropriate. To provide for adjustment and in this case to adjust for the planarity of the closure door 18 relative to the sub body 16 an adjustment mechanism is provided which comprises a pair of opposing set screws 86 that act in opposing horizontal direction (e.g. along an axis parallel) but off set from the central axis 34 as shown the set screws are threaded into threaded holes formed through the hinge housing 74 and act and are operable to position the bearing housing 78 and thereby the overall position of the vertical axis 61 upon which pivoting movement is provided for the inner upper and lower hinges 60, 62. It should be noted as shown in FIG. 5 that the inner lower hinge 62 has a direct mounting connection without a slidable bearing housing such that bearing position is fixed for the inner lower hinge 62.

Figure 3:
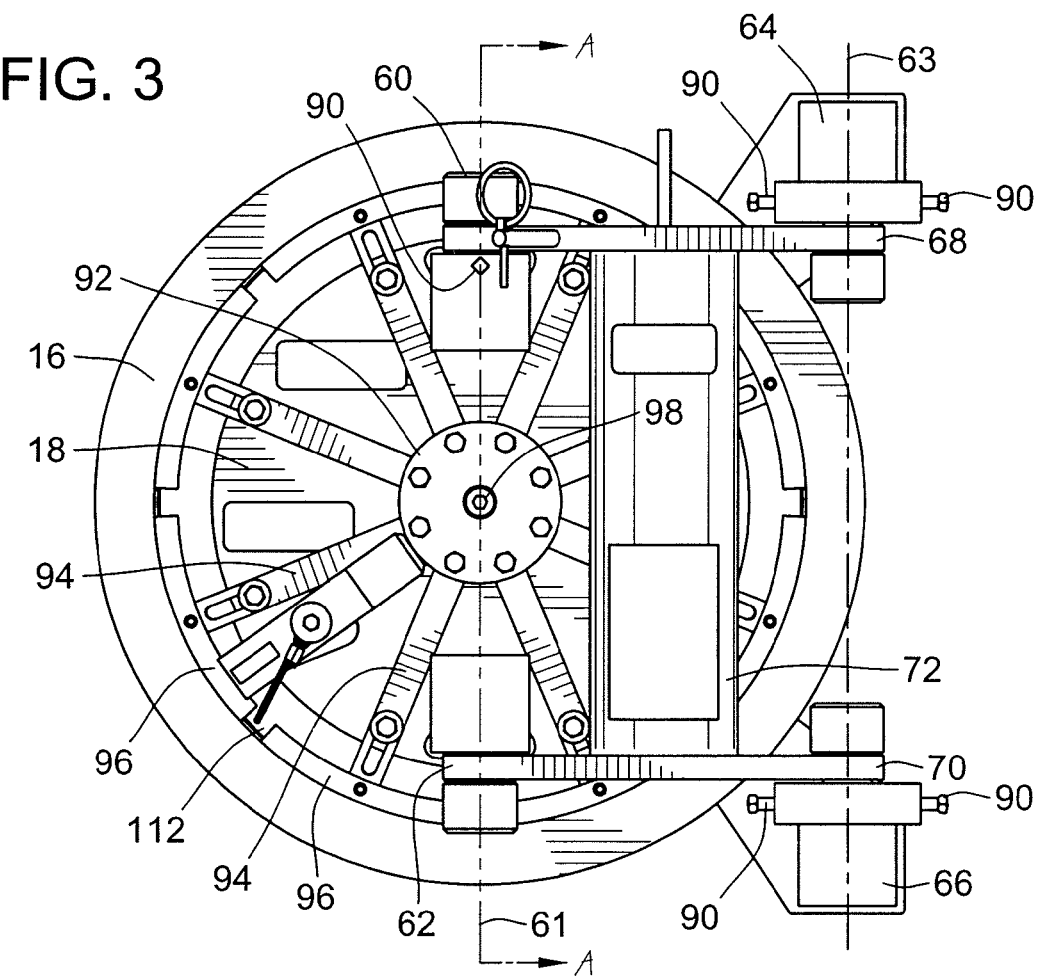
FIG. 3 is a frontal view of the closure apparatus shown in FIG. 2.

Referring to FIG. 3, similar pairs of set screws 90 are provided for the outer upper and lower hinges 64, 66 but in a perpendicular horizontal direction relative to the set screws 86 for the inner upper hinge 60, such that the bearing member and vertical axis 63 can be adjusted horizontally, but perpendicular relative to the adjustment axis of the inner upper hinge 60. As a result, instead of adjusting planarity, these other pairs of set screws 90 act to adjust the concentricity of the closure door 18 relative to the sub body 16. Each of the outer upper and lower hinges 64, 66 can be similarly constructed but at a different orientation and elevation as shown in FIG. 7. Further these hinges can employ the same and/or similar components as the hinge shown in FIG. 7, such that it would be understood how these adjustment mechanisms work. Preferably, neither of the outer hinges 64, 66 have set screws that adjust for planarity. In other words, the adjustment has been split with the inner adjustment mechanism on the inner upper hinge 60 being solely responsible for adjustment of planarity while the outer pairs of set screws 90 are operable to adjust for concentricity. In relation to the outer upper and lower hinges 64, 66, the set screws 90 for the outer upper hinge 64 will adjust the concentricity of the top portion of the closure door 18 while the set screws 90 for the outer lower hinge 66 will adjust the concentricity for the lower portion of the closure door 18 given that the outer upper and lower hinges are disposed above and below the central axis 34 for the door. As a further consequence, each hinge may only include one operating pair of set screws and no hinge needs to have two pairs of set screws. Further, by splitting the planarity and concentricity adjustment functions among different hinges in the geometric arrangement provided, adjustment of different pairs of set screws on a same hinge will not be counterproductive to an adjustment that was just previously done (e.g. adjusting planarity does not inadvertently cause an error for concentricity).

Turning next to the door locking assembly 22, further attention can be had to FIGS. 2, 3, 5 and 6. The door locking assembly 22 generally includes a central drive hub 92 connected to a plurality of cross bars 94, that in turn are connected to a plurality of arcuate wedge segments 96. A drive hub 92 is rotatably mounted to the closure door 18 for rotation about a drive axis (which is the same axis as central axis 34, when the door is in the closed position and properly aligned). To facilitate rotatable mounting, a central shoulder bolt 98 may be utilized to rotatably secure the drive hub 92 to the center of the closure door 18. The drive hub 92 may include an annular groove 100 into which is received the inner ends 102 of the cross bars 94. Fastener 104 driven into the drive hub secure the inner ends 102 of the cross bars 98 within the annular groove 100 but allow for pivoting movement and axial sliding movement of the inner ends (thus a loose mounting connection is provided). As such the annular groove 100 is shaped large enough to accommodate such movement, which allows for and facilitates the axial flotation and the radial extension movement of the cross bars 94 as is explained herein.

Each cross bar 94 extends radially outwardly to a second outer end 106 that is directly mounted such as via a pivotal mounting to one of the arcuate wedge segments 96. The second outer end 106 is received into a radially extending slot 107 formed into the arcuate wedge segments 96, with the slightly greater width of the slot limiting pivoting movement of the wedge segments 96 relative to the cross bars 94. The inner end 102 of each cross bar includes a hole receiving a fastener 104 therethrough to secure the inner end to the drive hub 92 and likewise the outer end of the cross bar 96 includes a hole therethrough which receives a suitable fastener such as a coil spring pin 108 (or bolt or the like). The pins 108 are also received through corresponding axially extending holes through the arcuate wedge segments 96. The coil spring pin 108 allows for some pivoting movement of the arcuate wedge segment 96 relative to the cross bar 94 so that self adjustment and self location can be better facilitated. As shown, preferably the cross bars 94 themselves directly carry and are coupled to the arcuate wedge segments 96 without intervening structure there between.

The arcuate wedge segments 96 include a projecting wedge portion 110 that can be received closely in engagement with the wedge shaped recess 36 defined by the inner annular surface of the sub body 16. As a result, pressure loads exerted inside of a pressure vessel that are applied axially upon the closure door 18 are transmitted through the arcuate wedge segments 96 and directly to a surface and more specifically the stop abutment surface 35 defined by one of the surfaces of the wedge shaped recess 36. As a result, the arcuate wedge segments 96 carry the loads and transmit them directly to the sub body to maintain the closure door in a closed and sealed position. These wedge segments can be maintained under very little radial force and in fact mere frictional forces may be sufficient to hold the arcuate wedge segments 96 in place once under a pressure load. When the arcuate wedge segments 96 are placed in position and into engagement with the wedge shaped recess, the closure door 18 cannot be readily opened. When the arcuate wedge segments 96 are removed and spaced radially inward (e.g. through actuation of the door locking assembly and rotation of the drive hub), a closure door 18 can then be opened.

As shown, annular bracketless free gaps 112 are defined between adjacent wedge segments 96 in the closed position. Locating brackets need not be provided for engagement of the arcuate wedge segments. Instead, the present embodiment employs retainers which guide and allow for floating movement of the cross bars which thereby indirectly guide the movement of the arcuate wedge segments 96. As shown, each retainer 114 may include a bolt 116 that is mounted and screwed into the front outer surface 46 of the door. The bolt has an end stop 118 that may be accentuated or enlarged by virtue of a washer placed on the head of the bolt. The bolt 116 is received through an elongate slot 120 defined through the body of the corresponding cross bar 94. The cross bar 94 can thereby float axially by sliding inwardly and outwardly along the bolt 116 and can also move radially over the radial length of the slot 120. Thus in this fashion, the retainers 114 are operable to act directly upon the cross bars 94 and thereby serve to guide and set limits upon movement of the cross bars 94 and the arcuate wedge segments 96 carried thereby.

Preferably a coil spring 122 is concentricity mounted upon each bolt 116 to bias the cross bar 94 in a predetermined direction, which in this embodiment is axially inwardly toward the closure door 18. However, the cross bar 94 and the arcuate wedge segment 96 can float axially against the action of the coil spring 122. It should be noted that to facilitate all of this movement that the attachment of the inner ends 102 of the cross bars 94 at the drive hub 92 accommodates both pivoting and axial sliding movement of the cross bars 94 in part due to the fact that the annular groove thickness 100 is thicker than the corresponding axial thickness of the cross bars 94 to accommodate such axial flotation movement.

With this arrangement, the drive hub 92 can be rotated in opposite angular directions to drive the arcuate wedge segments 96 radially outwardly or inwardly guided by the action of the retainers 114 upon the respective cross bars 94. As a result, the arcuate wedge segments 96 can be slid into engagement with the corresponding wedge shaped recess 36 or driven back inwardly out of engagement to allow for movement of the closure door 18. It should be noted that during such movement between the open and closed position that the wedge shaped projections are self locating and self adjust as the projection wedge portion 110 co-acts with corresponding wedge shaped surfaces of the wedge shaped recess 36, which is accommodated by virtue of the fact that the cross bars 94 can float in the axial direction. In other words, the arcuate wedge shaped segments 96 cam themselves into position and cam the closure door 18 shut tight into sealing engagement by virtue of mutual engagement and cooperation between inclined surfaces. Additionally, the spacing between the annular gaps 112 between adjacent arcuate wedge segments 96 is maintained by virtue of the retainers 114 which maintain radial spacing between the arcuate wedge segments 96 by controlling the movement of the cross bars 94. As a result, the arcuate wedge segments 96 can be maintained at equal angular intervals about the central axis 34.

To facilitate cranking of the door locking assembly 22, a crank handle 124 is securely affixed to the drive hub 92 and extends radially outwardly therefrom. The crank handle may include a coupler 126 that can mate with a corresponding coupler 128 of a pry bar 130 that can be removably slid onto the crank handle 124 to facilitate increased manual leveraging of the crank handle 124. In either event, the crank handle 124 can be driven in opposite angular directions to facilitate extension and retraction of the cross bars 94 simultaneously and thereby radially inward and outward movement of the arcuate wedge segments 96 carried thereby.

Figure 6:
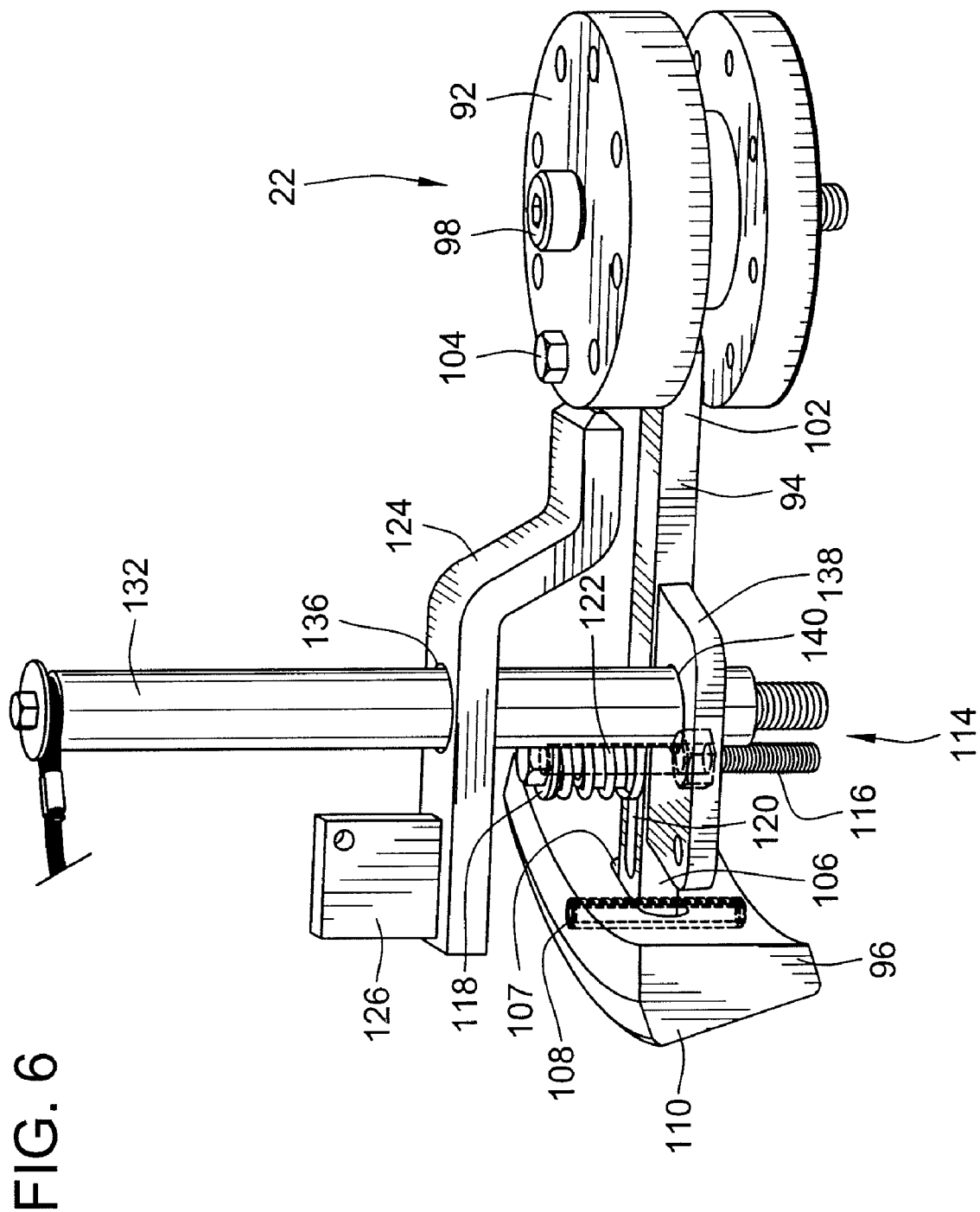
FIG. 6 is a detailed isometric view of a portion of the drive hub assembly used in the closure apparatus of the previous figures.

Yet another feature that can be provided is the provision of a lock bar 132 which threads into a threaded hole in the door, and for example may plug a pressure relief hole that extends all of the way through the closure door. Typically, this lock bar 132 will be withdrawn manually by unscrewing to insure that there is no pressure or to relieve whatever pressure remains in the pressure vessel. As a result pressure does not force the door open. Additionally as an added feature to prevent tampering, the lock bar extends through a formed hole 136 in the handle which prevents rotation of the handle while the lock bar 132 is place. As a result, the closure door 18 cannot accidentally be opened while the lock bar 132 is in place. Still further to prevent tampering and as another feature that is employed in the present embodiment, the lock bar 132 can act directly on one of the cross bars. For example, as shown in FIG. 6 one of the cross bars includes attached thereto an extension plate that itself defines a hole 140 that also receives a pressure lock bar therethrough. With the cross bars and the extension plate 138 located closer to the front outer surface 46 of the closure door, the extension plate can be provided to also cover the pressure relief hole when the door is opened to better prevent tampering therewith. Further, when the door locking assembly 22 is driven to the full lock position (and not short thereof) a corresponding holes 136, 140 concentricity align along with at least practically threaded pressure relief hole 134 formed through the door which better insure that the door locking assembly 22 has in fact the fully extended position with the arcuate wedge segments 96 in the proper position. Typically and although not illustrated, the lock bar 132 will carry a seal on its end to hermetically seal the pressure relief hole 134 when installed therein (alternatively, the pressure relief hole may not extend all of the way through the door and therefore not relieve pressure).

Figure 8:
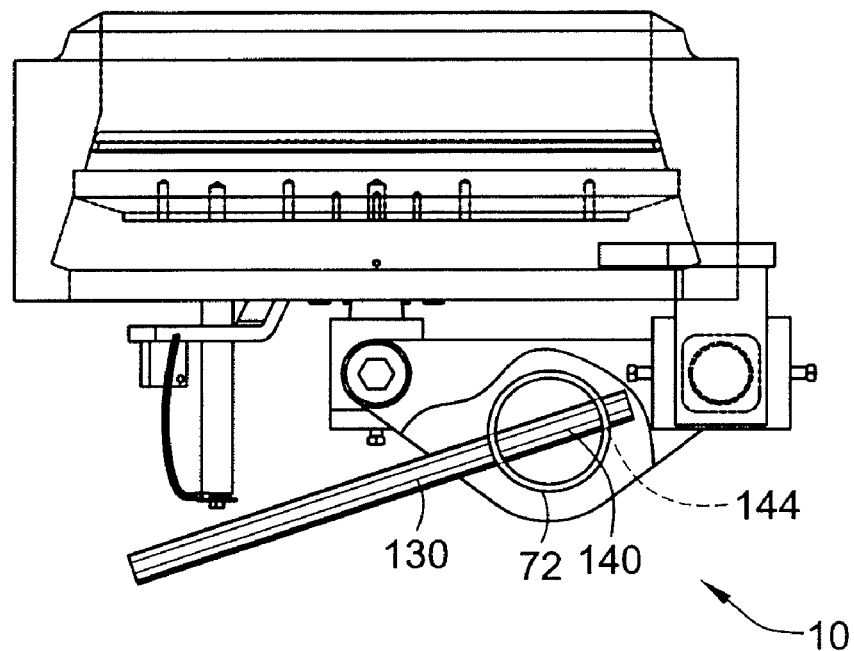
FIG. 8 is a partially schematic top view of a closure apparatus showing a pry bar leveraging feature.
Figure 9:
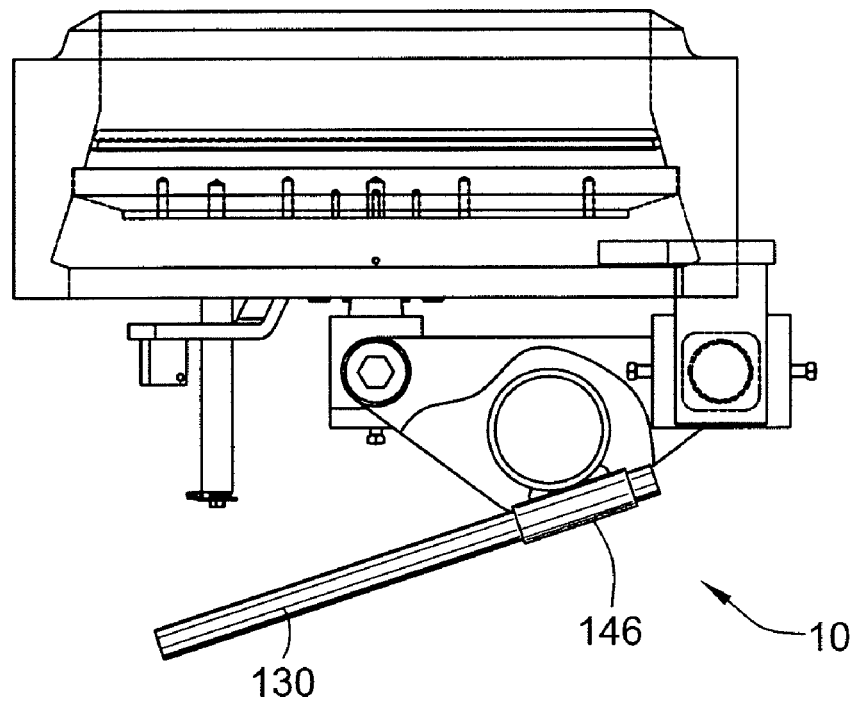
FIG. 9 is another partially schematic top view similar to FIG. 8 but showing a slightly different pry bar leveraging embodiment.

Yet another feature that advantageously can better allow one individual worker to open and close the door is a means to increase the leverage applied to this type of a closure door 18. Specifically, as illustrated in FIG. 8, a horizontal diagonal hole 144 can be formed through the vertical column 72 of the hinge assembly 20 which can receive the pry bar 130 and thereby allow someone to more easily manually leverage and manipulate the closure door 18. A manual worker can thereby act directly upon the hinge assembly 20 through the provision of the coupler provided by the horizontal diagonal hole. An alternative embodiment is shown in FIG. 9 which instead of a hole formed through the vertical column a mounting bracket 146 is provided that which is welded to a vertical column 72 and similarly provides a coupler that can receive a pry bar 130 for purposes of increasing the leveraging and manual manipulation of the closure door.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A closure apparatus, comprising:
a sub body having an annular opening;
a closure door carried by the sub body and movable thereto between an open position and a closed position;
a plurality of arcuate segments arranged between the closure door and the sub body in the closed position; wherein bracketless gaps are defined between adjacent arcuate segments; a drive hub rotatably mounted to the closure door for rotation about a drive axis;
and a plurality of cross bars, each cross bar having a first end pivotably mounted to the drive hub and a second end pivotably mounted to one of the arcuate segments; wherein the arcuate segments are directly mounted to the cross bars and pivotable relative to the cross bars via fasteners, each fastener pivotably connecting one of the arcuate segments with one of the crossbars.

2. The closure apparatus of claim 1, further comprising a plurality of retainers mounted to the closure door, each retainer acting upon one of the cross bars between the first and second ends allowing the cross bar to move radially and float axially relative to the drive axis; and wherein the sub body includes a wedge shaped recess and wherein each arcuate segment includes a wedge shaped projection engaging the wedge shaped recess in the closed position, wherein during movement from the open to the closed position, the wedge shaped projection of each arcuate segment self adjusts and self locates as it coacts with the wedge shape recess due to the cross bar floating axially.

3. The closure apparatus of claim 2, wherein each retainer comprises a bolt having an end stop, the bolt extending through an elongated slot in one of the cross bars with an end screwed into the closure door wherein said one of the cross bars can float axially generally between the end stop and the door; and further including a spring carried by the bolt biasing said one of the cross bars axially relative to the closure door.

4. A closure apparatus, comprising:
a sub body having an annular opening;
a closure door carried by the sub body and movable thereto between an open position and a closed position;
a plurality of arcuate segments arranged between the closure door and the sub body in the closed position wherein bracketless gaps are defined between adjacent arcuate segments; a drive hub rotatably mounted to the closure door for rotation about a drive axis; and a plurality of cross bars, each cross bar having a first end pivotably mounted to the drive hub and a second end pivotably mounted to one of the arcuate segments, a coupling member extending through corresponding holes in corresponding ones of the arcuate segments and cross bars.

5. The closure apparatus of claim 4, wherein said coupling member comprises a coil spring pin.

6. A closure apparatus, comprising:
a sub body having an annular opening and including a wedge shaped recess; a closure door carried by the sub body and movable thereto between an open position and a closed position; a plurality of arcuate segments, each arcuate segment including a wedge shaped projection engaging the wedge shaped recess in the closed position;
a plurality of cross bars, each cross bar carrying one of the arcuate segments,
a plurality of retainers mounted to the closure door retaining the cross bars to the closure door such that the cross bars and the arcuate segments float axially relative to the door; wherein during movement from the open position to the closed position, the wedge shaped projection of each arcuate segment self adjusts and self locates as it coacts with the wedge shape recess due to the cross bar floating axially, wherein the retainers provide an axial range of movement and flotation for the cross bars and arcuate segments while the cross bars are stationary in the radial direction.

7. A closure apparatus, comprising:
a sub body having an annular opening and including a wedge shaped recess; a closure door carried by the sub body and movable thereto between an open position and a closed position; a plurality of arcuate segments, each arcuate segment including a wedge shaped projection engaging the wedge shaped recess in the closed position;
a plurality of cross bars, each cross bar carrying one of the arcuate segments,
a plurality of retainers mounted to the closure door retaining the cross bars to the closure door such that the cross bars and the arcuate segments float axially relative to the door; wherein during movement from the open position to the closed position, the wedge shaped projection of each arcuate segment, self adjusts and self locates as it coacts with the wedge shape recess due to the cross bar floating axially, wherein each retainer comprises a bolt having an end stop, the bolt extending through an elongated slot in one of the cross bars with an end screwed into the closure door wherein said one of the cross bars can float axially generally between the end stop and the door; and further including a spring carried by the bolt biasing said one of the cross bars axially relative to the closure door.

8. The closure apparatus of claim 6, further comprising means for actuating the cross bar members and for driving the arcuate segments radially inwardly and outwardly, and wherein the retainers locate and guide movement of the cross bars radially.

9. A closure apparatus, comprising:
a sub body having an annular opening and including a wedge shaped recess; a closure door carried by the sub body and movable thereto between an open position and a closed position; a plurality of arcuate segments, each arcuate segment including a wedge shaped projection engaging the wedge shaped recess in the closed position;
a plurality of cross bars, each cross bar carrying one of the arcuate segments,
a plurality of retainers mounted to the closure door retaining the cross bars to the closure door such that the cross bars and the arcuate segments float axially relative to the door; wherein during movement from the open position to the closed position, the wedge shaped projection of each arcuate segment self adjusts and self locates as it coacts with the wedge shape recess due to the cross bar floating axially, further a coupling member extending through corresponding holes in corresponding ones of the arcuate segments and cross bars.

10. The closure apparatus of claim 9, wherein said coupling member comprises a coil spring pin.

11. A closure apparatus, comprising:
a sub body having an annular opening with a sealing surface defined about a central axis;
a closure door carried by the sub body and movable thereto between an open position and a closed position;
a first hinge mounted to the closure door;
a second hinge mounted to the sub body;
a swing arm connecting the first and second hinges;
a first adjustment mechanism on the first hinge, the first hinge being radially spaced from the central axis, wherein the adjustment mechanism is adjustable to adjust planarity between the closure door and the sub body, further comprising a second adjustment mechanism on the second hinge, wherein the second adjustment mechanism is adjustable to adjust concentricity between the closure door and the sub body, wherein the first hinge defines a first hinge axis that extends generally through the central axis; and wherein the second hinge defines a second hinge axis extending generally parallel to the first hinge axis and not intersecting the central axis.

12. The closure apparatus of claim 11, wherein the first and second hinges comprise first and second hinge bodies affixed to the closure door and the sub body respectively, and first and second hinge bolts pivotably mounting the swing arm to the first and second hinge bodies, respectively, wherein the first and second adjustment mechanisms comprise set screws, including a first pair of set screws acting on opposing sides of the first hinge bolt to set a position the first hinge bolt relative to the first hinge body and a second pair of set screws acting on opposing sides of the second hinge bolt to set a position the second hinge bolt relative to the second hinge body, and wherein the first pair of set screws act a direction that is perpendicular to a direction of action for the second pairs of set screws.

13. The closure apparatus of claim 12, wherein the second hinge includes only the second pair of set screws and wherein the first hinge includes only the first pair of set screws.

14. The closure apparatus of claim 13, further comprising:
a third hinge mounted to the closure door, the third hinge aligned along the first hinge axis to work in cooperation with the first hinge;
a fourth hinge mounted to the sub body, the fourth hinge aligned along the second hinge axis to work in cooperation with the second hinge, the first and second hinges being above the central axis and the third and fourth hinges being below the central axis;
a second swing arm connecting the third and fourth hinges;
a column connecting the swing arms;
a third adjustment mechanism on the fourth hinge comprising a third pair of set screws, wherein the third adjustment mechanism is adjustable to adjust concentricity between the closure door and the sub body in cooperation with the second adjustment mechanism.

15. A closure apparatus, comprising:
a sub body having an annular opening and including a wedge shaped recess and a conical sealing surface proximate the wedge shaped recess, the sub body being a metal forging and having an annular wall body region and a neck region, the neck region providing a welding surface for welding to a pressure vessel;
a closure door carried by the sub body and movable thereto between an open position and a closed position;
a plurality of arcuate segments, each arcuate segment including a wedge shaped projection engaging the wedge shaped recess in the closed position; and
wherein the annular wall body region has an annular portion surrounding the sealing surface that becomes thicker in cross section as the sealing surface and annular body region extend toward the neck region.

16. The closure apparatus of claim 15, wherein said annular portion provides means for reducing warpage during welding of the neck region.

17. The closure apparatus of claim 16, wherein the annular portion of the wall body region surrounding the sealing surface has an outer peripheral surface that is a raw forged cylindrical surface.

18. The closure apparatus of claim 17, further comprising a drive hub rotatably mounted to the closure door for rotation about a drive axis; a plurality of cross bars, each cross bar having a first end pivotably mounted to drive hub and a second end acting upon one of the arcuate segments; and a crank operable to drive the drive hub about the drive axis.

19. A closure apparatus, comprising:
   a sub body having an annular opening and including a wedge shaped recess; a closure door carried by the sub body and movable thereto between an open position and a closed position;
   a plurality of arcuate segments, each arcuate segment including a wedge shaped projection engaging the wedge shaped recess in the closed position;
   a plurality of cross bars, each cross bar having a first end acted upon by the drive hub and a second end acting upon one of the arcuate segments;
   a crank operable to drive the drive hub about the drive axis; and
   a lock member removably mounted to the closure door, the lock member engaging the crank and one of the cross bars preventing movement of the crank and the cross bars when mounted to the closure door.

20. The closure apparatus of claim 19, further comprising an extension plate mounted to one of the cross bars, the extension plate defining a through hole receiving the lock member therethrough, the lock member having a threaded end screwed into the pressure relief hole.

21. The closure of claim 19, further comprising a pressure relief hole formed through the closure door, the lock member plugging the pressure relief hole when mounted to the closure door.

22. A closure apparatus, comprising:
   a sub body having an annular opening and including a wedge shaped recess; a closure door carried by the sub body and movable thereto between an open position and a closed position;
   a hinge assembly between the closure door and the sub body to provide for a swinging movement of the closure door between the open and closed positions;
   a plurality of arcuate segments, each arcuate segment including a wedge shaped projection engaging the wedge shaped recess in the closed position;
   a plurality of cross bars, each cross bar having a first end acted upon by the drive hub and a second end acting upon one of the arcuate segments;
   a crank operable to drive the drive hub about the drive axis; and
   a pry bar receivable into a first coupler on the hinge assembly for facilitating manually operated swinging movement of the closure door, wherein the pry bar is also receivable into a second coupler on the crank to facilitate increased manual leverage of the drive hub.

23. The closure apparatus of claim 1, wherein each fastener is a pin.

24. The closure apparatus of claim 23, wherein the pin is a coil spring pin.

25. The closure apparatus of claim 1, wherein the fastener is a bolt.

* * * * *

UNITED STATES PATENT AND TRADEMARK OFFICE
CERTIFICATE OF CORRECTION

| | | |
|---|---|---|
| PATENT NO. | : 8,297,463 B2 | Page 1 of 1 |
| APPLICATION NO. | : 12/105323 | |
| DATED | : October 30, 2012 | |
| INVENTOR(S) | : James G. McQuaid et al. | |

It is certified that error appears in the above-identified patent and that said Letters Patent is hereby corrected as shown below:

Column 11, line 4; claim 7 should read:

7. A closure apparatus, comprising:
a sub body having an annular opening and including a wedge shaped recess; a closure door carried by the sub body and movable thereto between an open position and a closed position; a plurality of arcuate segments, each arcuate segment including a wedge shaped projection engaging the wedge shaped recess in the closed position;
a plurality of cross bars, each cross bar carrying one of the arcuate segments,
a plurality of retainers mounted to the closure door retaining the cross bars to the closure door such that the cross bars and the arcuate segments float axially relative to the door; wherein during movement from the open position to the closed position, the wedge shaped projection of each arcuate ~~segment,~~ segment self adjusts and self locates as it coacts with the wedge shape recess due to the cross bar floating axially, wherein each retainer comprises a bolt having an end stop, the bolt extending through an elongated slot in one of the cross bars with an end screwed into the closure door wherein said one of the cross bars can float axially generally between the end stop and the door; and further including a spring carried by the bolt biasing said one of the cross bars axially relative to the closure door.

Signed and Sealed this
Twenty-second Day of January, 2013

David J. Kappos
*Director of the United States Patent and Trademark Office*